No. 690,466. Patented Jan. 7, 1902.
A. B. SCHOFIELD.
SHACKLE SEAL.
(Application filed Nov. 7, 1901.)

(No Model.)

Witnesses:
George Barry Jr.
Henry Thieme.

Inventor:
Albert B. Schofield
By Brown & Seward
his Attorneys

THE NORRIS PETERS CO., PHOTO-LITHO., WASHINGTON, D. C.

UNITED STATES PATENT OFFICE.

ALBERT B. SCHOFIELD, OF BROOKLYN, NEW YORK, ASSIGNOR TO KEYSTONE SEAL & PRESS COMPANY, OF NEW YORK, N. Y., A CORPORATION OF NEW JERSEY.

SHACKLE-SEAL.

SPECIFICATION forming part of Letters Patent No. 690,466, dated January 7, 1902.

Application filed November 7, 1901. Serial No. 81,423. (No model.)

*To all whom it may concern:*

Be it known that I, ALBERT B. SCHOFIELD, a citizen of the United States, and a resident of the borough of Brooklyn, in the city and State of New York, have invented a new and useful Shackle-Seal, of which the following is a specification.

My invention relates to a shackle-seal in which a flexible strip of thin sheet metal, which for convenience is called the "bail," has its ends united by a soft-metal plug or rivet of such nature that it may be expanded, the pressure to lock the parts of the bail together.

My present invention is more particularly directed to means for preventing the severing of the plug or rivet intermediate of the two united ends of the bail by means of a sharp knife, while at the same time maintaining the rivet in a condition in which it may be readily expanded without injury to the press expanding tool.

A practical embodiment of my invention is represented in the accompanying drawings, in which—

Figure 1:
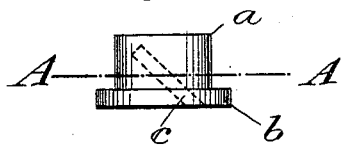
Figure 2:
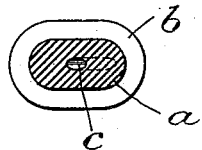
Figure 3:
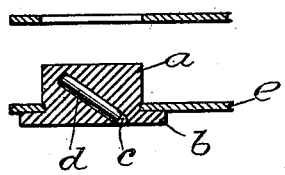
Figure 4:
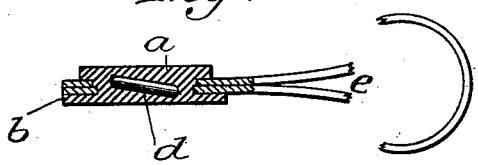

Figure 1 is a view of the blank plug or rivet in side elevation. Fig. 2 is a transverse section through the same in the plane of the line A A of Fig. 1. Fig. 3 is a vertical section through the plug or rivet, showing it attached to one part of the bail as it appears when ready for use; and Fig. 4 shows the plug or rivet in its compressed or locking position uniting the two ends of the bail.

The rivet or plug is denoted by $a$. It is provided with an enlarged head $b$, and its shape in cross-section is preferably an oval for the purpose of providing an increased amount of metal without unduly increasing the width of the opening in the bail which is intended to receive it.

The rivet or plug $a$ is provided with an elongated socket $c$, extending diagonally therein from the head toward the opposite end of the rivet or plug for the reception therein of a hard-metal rod, pin, or wire, preferably a piece of hard-steel wire $d$.

After the plug or rivet is cast and before it is attached to the part $e$ of the bail ready for shipment and use the wire $d$, which has preferably been operated upon in a tumbling-barrel to smooth its ends in order that it may not injure the press, is inserted in the socket $c$, and the plug is then inserted through the opening in the part $e$ of the bail and submitted to an endwise pressure sufficient to expand it slightly an amount sufficient to lock it to the part $e$ of the bail against displacement until it shall have been finally compressed by the seal-press. This previous expanding pressure will also close or partially close the outer end of the socket $c$ sufficiently to retain the wire $d$ in its position in the socket against displacement during the shipment and handling of the seal preparatory to the final locking operation.

When the free end of the shackle has been passed through the loop, as is common in sealing, and its free end placed over the small end of the plug or rivet $a$, the pressure of the seal-press upon the opposite ends of the rivet or plug which spreads the metal on the outer faces of the parts of the bail will force the steel wire $d$ into position diagonally across the plane passing between the opposite parts of the bail—*i. e.*, across the path which the blade of a knife would have to travel in in the attempt to cut the sealing-plug intermediate of the two parts of the bail, and hence the said steel wire will form an absolute barrier to the passage of such knife-blade.

The diagonal position of the wire places it in position where it will readily yield to the pressure exerted upon the opposite ends of the soft-metal plug without adding materially to the pressure required to compress the seal, and its ends will not interfere with or harm the jaws of the press carrying their symbols of identification.

What I claim is—

1. A soft-metal rivet or plug blank provided with a socket for the reception of a hard-metal guard, substantially as set forth.

2. A soft-metal rivet or plug blank provided with a socket extending diagonally therein for the reception of a hard-metal guard, substantially as set forth.

3. A soft-metal rivet or plug for sealing purposes provided with an elongated socket extending diagonally therein and a hard-metal rod or wire secured in said socket, substantially as set forth.

4. The combination with a shackle having a soft-metal rivet or plug secured to one of its parts and provided with an elongated socket extending diagonally therein and a hard-metal rod or wire locked in said socket, substantially as set forth.

5. A sealing plug or rivet of soft metal having an elongated rod of hard metal located therein and extending in a diagonal direction from the head portion toward the opposite end of the rivet, substantially as set forth.

In testimony that I claim the foregoing as my invention I have signed my name, in presence of two witnesses, this 6th day of November, 1901.

ALBERT B. SCHOFIELD.

Witnesses:
  FREDK. HAYNES,
  HENRY THIEME.